United States Patent
Moss

(10) Patent No.: US 9,155,296 B2
(45) Date of Patent: Oct. 13, 2015

(54) STRIKER FOR CALLING GAME AND METHOD

(75) Inventor: James P. Moss, Louisville, KY (US)

(73) Assignee: EVERGREEN HUNTING LLC, Louisville, KY (US)

( * ) Notice: Subject to any disclaimer, the term of this patent is extended or adjusted under 35 U.S.C. 154(b) by 704 days.

(21) Appl. No.: 13/195,960

(22) Filed: Aug. 2, 2011

(65) Prior Publication Data

US 2012/0045963 A1 Feb. 23, 2012

Related U.S. Application Data

(60) Provisional application No. 61/375,413, filed on Aug. 20, 2010.

(51) Int. Cl.
*A63H 5/00* (2006.01)
*A01M 31/00* (2006.01)

(52) U.S. Cl.
CPC .................................. *A01M 31/004* (2013.01)

(58) Field of Classification Search
CPC .............................. A63H 5/00; A01M 31/004
USPC .................. 446/418, 397; 84/422.4; 411/354; 403/296, 343; 473/44; 81/177.2, 81/177.85, 489, 491
See application file for complete search history.

(56) References Cited

U.S. PATENT DOCUMENTS

| | | | | |
|---|---|---|---|---|
| 2,025,181 A | * | 12/1935 | Simon | 446/397 |
| 2,592,978 A | * | 4/1952 | Trimboli | 81/177.2 |
| 3,301,119 A | * | 1/1967 | Gilbert | 84/422.4 |
| 3,730,570 A | * | 5/1973 | Brochstein | 403/361 |
| 3,766,683 A | * | 10/1973 | Vennola | 446/126 |
| 4,123,090 A | | 10/1978 | Kotsakis et al. | |
| 4,640,176 A | * | 2/1987 | Elliott, Jr. | 84/422.4 |
| 4,640,177 A | * | 2/1987 | Elliott, Jr. | 84/422.4 |
| 4,699,403 A | * | 10/1987 | Wong | 285/233 |
| 4,852,782 A | * | 8/1989 | Wu et al. | 224/661 |
| 5,503,057 A | * | 4/1996 | Smith, Jr. | 84/422.4 |
| 5,503,585 A | * | 4/1996 | Heineman | 446/397 |
| 5,529,526 A | * | 6/1996 | Wesley | 446/397 |
| 5,716,254 A | | 2/1998 | Bowes | |
| 5,814,747 A | * | 9/1998 | Ramsell | 84/402 |
| 5,846,119 A | * | 12/1998 | Long | 446/397 |
| 5,928,056 A | * | 7/1999 | Molotschko | 446/418 |
| 5,961,367 A | * | 10/1999 | Morris | 446/397 |
| 5,977,465 A | * | 11/1999 | Piper | 84/422.4 |
| 6,028,260 A | * | 2/2000 | LaLonde | 84/422.4 |
| 6,110,055 A | * | 8/2000 | Wilson | 473/239 |
| 6,149,493 A | * | 11/2000 | Long | 446/397 |
| 6,162,979 A | * | 12/2000 | Gauger | 84/422.4 |
| 6,180,860 B1 | * | 1/2001 | Chen | 84/422.4 |
| 6,210,252 B1 | | 4/2001 | Anderson | |
| 6,310,278 B1 | * | 10/2001 | Butler | 84/422.4 |
| 6,339,979 B1 | * | 1/2002 | Chiang | 81/177.2 |
| 6,443,803 B1 | * | 9/2002 | Epple, Jr. | 446/418 |
| 6,669,529 B1 | | 12/2003 | Scaries | |

(Continued)

OTHER PUBLICATIONS

Hunter's Specialties 2011 Product Guide, pp. 71 and 73.

*Primary Examiner* — Michael Dennis
*Assistant Examiner* — Urszula M Cegielnik
(74) *Attorney, Agent, or Firm* — Tarolli, Sundheim, Covell & Tummino LLP

(57) ABSTRACT

A striker for game calling including a body portion, a releasable locking device located at one end of the body portion, and a peg extending from the body portion and held to the body portion by the releasable locking device.

6 Claims, 4 Drawing Sheets

(56) References Cited

U.S. PATENT DOCUMENTS

| | | |
|---|---|---|
| 6,695,674 B1 * | 2/2004 | Davis et al. ............. 446/418 |
| 7,169,009 B2 * | 1/2007 | Marsh ..................... 446/397 |
| 7,264,429 B2 * | 9/2007 | Miller ..................... 279/42 |
| 7,704,159 B1 * | 4/2010 | McDonald ............... 473/296 |
| 7,785,169 B2 | 8/2010 | Moss |
| 7,984,528 B2 * | 7/2011 | Giacolo et al. ............ 15/145 |
| 8,029,382 B2 * | 10/2011 | DeShiell et al. ........... 473/307 |
| 2008/0168889 A1 * | 7/2008 | Rundle .................... 84/422.4 |
| 2009/0053973 A1 | 2/2009 | Rydbom |
| 2009/0258569 A1 * | 10/2009 | Wade ...................... 446/418 |
| 2010/0151769 A1 * | 6/2010 | Coffield ................... 446/418 |
| 2011/0201248 A1 * | 8/2011 | Bean ....................... 446/418 |

* cited by examiner

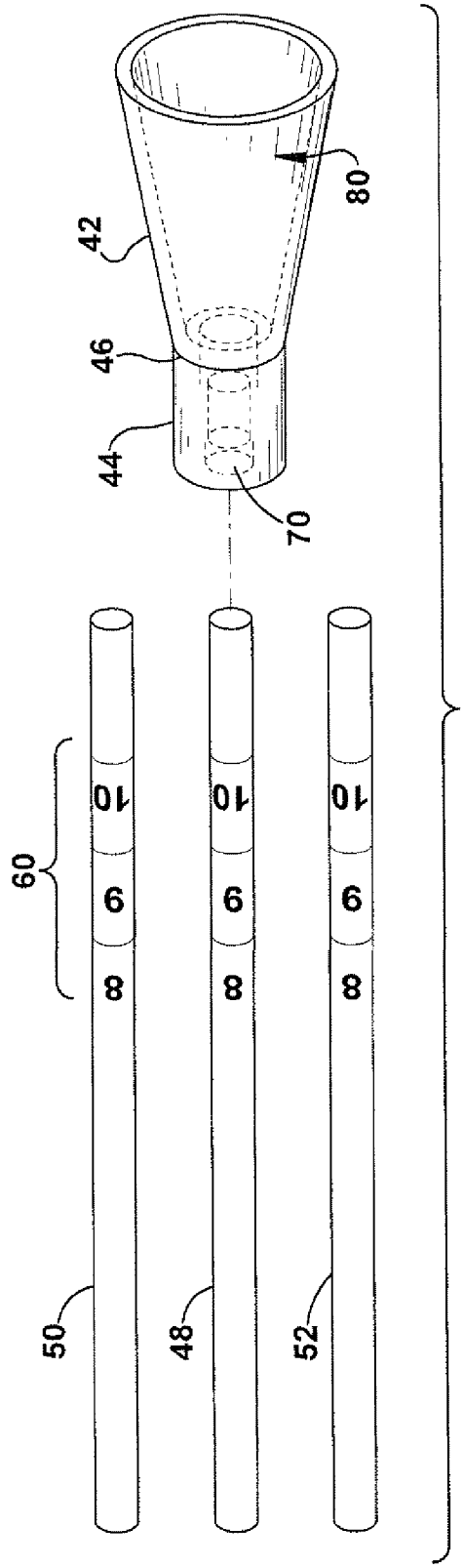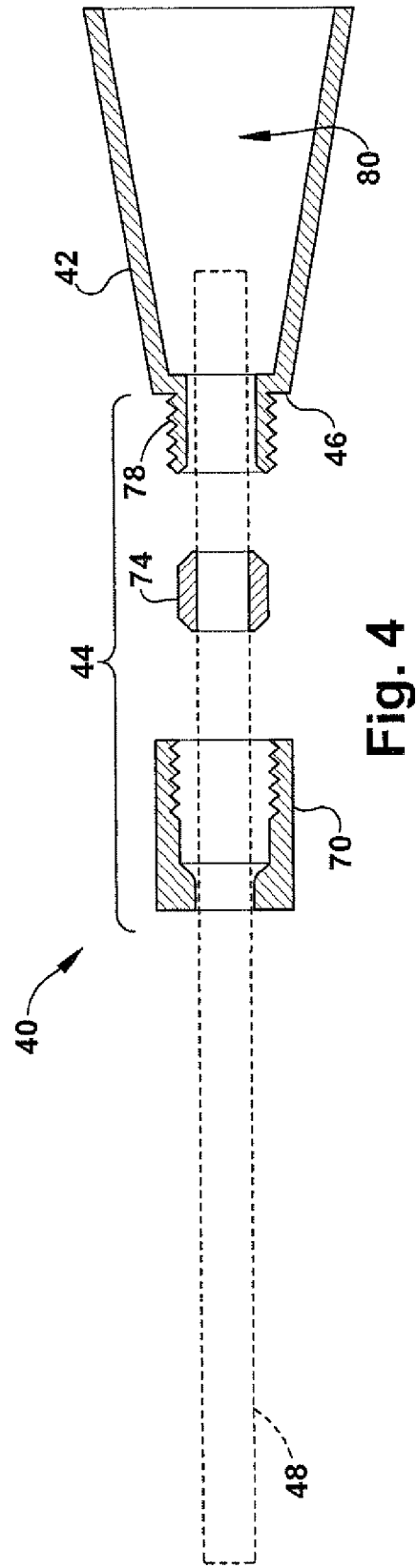

STRIKER FOR CALLING GAME AND METHOD

RELATED PATENT APPLICATION

Priority is hereby claimed to U.S. Provisional Application No. 61/375,413, to Moss entitled "Striker for Calling Game and Method" and filed Aug. 20, 2011, and which is hereby fully incorporated herein by reference.

FIELD OF THE INVENTION

The present invention is directed to striker assembly for use with calling game such as turkeys and a method for making such a striker.

BACKGROUND

Turkey call devices that use a pot and a hand-held striker are known. Such arrangements include a pot having a friction surface made of a material such as slate, ceramic, or other suitable material. The striker has a handle and a fixed peg. When the end of the peg is rubbed across the striker surface of the pot, a game call sound is made that simulates the sound of the game of interest, such as a turkey. An improved turkey call device is shown and described in U.S. Pat. No. 7,785,169 to James P. Moss, issued Aug. 31, 2010 and is hereby fully incorporated herein, U.S. Pat. No. 6,210,252 shows a striker for a game caller having an interchangeable tip.

U.S. Patent Publication 2009/0053973 discloses a game caller with an attachable means on the pot for holding a plurality of strikers.

SUMMARY OF THE INVENTION

The present invention provides a striker of a game caller having a body portion and a replaceable peg that can be releasably locked into the body portion of the striker to a selectable length.

In accordance with one example embodiment of the present invention, a striker for game calling includes a body portion, a releasable locking device located at one end of the body portion, and a peg extending from the body portion and held to the body portion by the releasable locking device.

In accordance with another example embodiment of the present invention, a method is provided for forming a striker for game calling comprising the steps of securing a peg to a body portion using a releasable locking device.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 3 is side view of a striker made in accordance with an example embodiment of the present invention showing replaceable pegs removed from the body portion of the striker; and FIG. 4 is side view of a striker made in accordance with an example embodiment of the present invention showing an exploded view of the releasable locking device portion;

DETAILED DESCRIPTION

Figure 1:
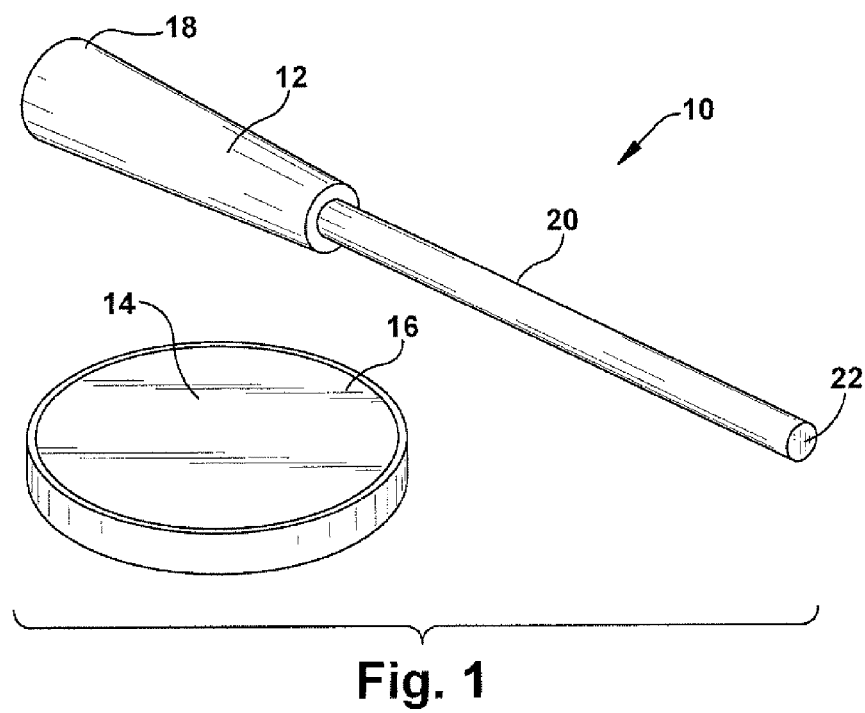
FIG. 1 is a schematic of a game calling device including a pot and a striker having a fixed peg.

Referring to FIG. 1, a game caller 10 is shown for calling game such as a turkey. The game caller 10 includes a striker 12 and a pot 14. The pot has a friction surface 16 which may be made from slate, ceramic, or other suitable material. The striker 12 includes a body portion 18 and a peg 20 fixed to the body portion 18. The striker is made from a suitable material such as wood. When the tip 22 of the striker 12 is rubbed across the friction surface 16 of the pot 14, a game sound is made that simulates the call of the game such as a turkey.

Figure 2:
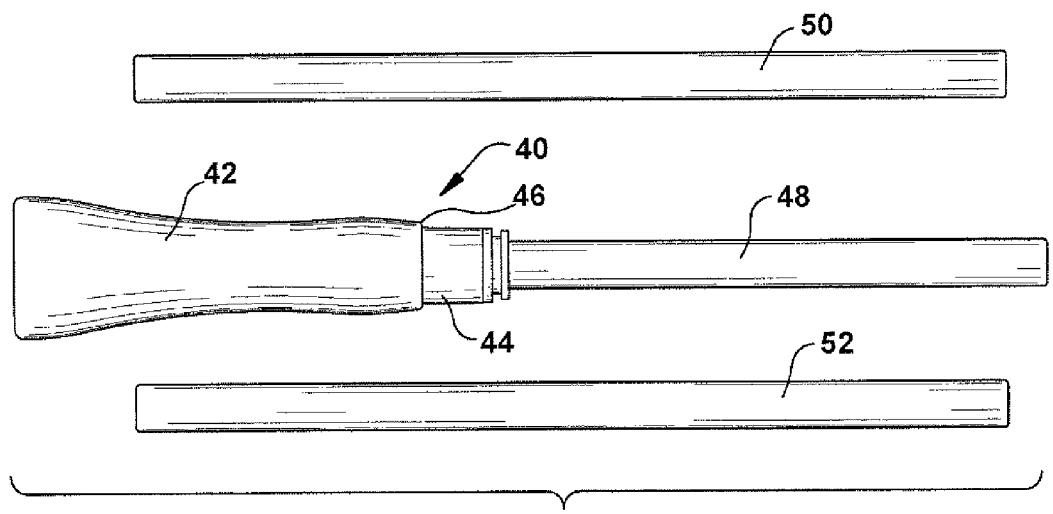
FIG. 2 is side view of a striker made in accordance with an example embodiment of the present invention.

Referring to FIGS. 2-4, a striker 40 made in accordance with an example embodiment of the present invention is shown. The striker 40 includes a body portion portion 42, a releasable locking device 44 secured to one end 46 of the body portion 42 and a peg 48 releasable secured to the body portion 42 via the releasable locking device 44.

The releasable locking device 44 can take any of several forms such as a screw tightening lock or a push/pull type of lock. The body portion, near the end 46, can alternatively have projecting fork-type members that can bend slightly when a locking nut is secured to the body portion to force the projecting fork members into holding engagement with the peg.

The inside portion of the releasable locking device and the body portion 42 are both hollow so as to receive the peg 48 to a selectable length, i.e., the peg 48 can be positioned and locked to the body portion 42 so that a desired length of peg extends from the body portion 42 and locking device 44. Not only can the length of the peg 48 extending from the body portion be selected, the present arrangement allows for easy changing and assembly of a striker using other pegs, such as pegs 50, 52, made of different materials, e.g., pine, hickory, oak, carbon fiber, etc.

It has been discovered that the sound produced by the game caller depends on the material of the striker, e.g., composition of the peg, the length of the peg extending from the body portion, the length of the overall striker, composition and weight of the body portion of the striker, weight of the striker, the center of balance of the striker, and the intensity of firmness with which the striker is held by the user while making the game call sound.

Wood has a varying density depending on the cellular structure and growth characteristics of the individual species. Some wood, such as cedar, are soft with a density of 380 kg/cu·m while others, such as ebony, are very hard with a density of 1100 kg/cu·m.

| | |
|---|---|
| Cedar, red | 380 |
| Cypress | 510 |
| Douglas Fir | 530 |
| Spruce (Canadian) | 450 |
| Spruce (Sitka) | 450 |

The wood used to make the striker affects the sound produced. Pegs made of softer wood, e.g., those with a density of 25 lbs/cubic foot produce a better sound on a softer friction surface of the pot, e.g. slate. Hickory produces a better sound on a pot having a ceramic friction surface. The length of the peg extending from the body portion determines the frequency and oscillation pattern of the sound produced. Also, the density of the peg effects the frequency of the sound produced.

A turkey, for example, makes a yelp that varies from 500 Hz to above 1400 Hz. A hickory peg, for example, may not satisfactorily cover the lower range frequencies of 500 Hz-800 Hz. The present arrangement thus allows for tuning of the game caller in the field (i.e., while hunting) by adjusting the peg length extending from the body portion and by selecting the appropriate peg made from a specific material to account for climate conditions, terrain, and response of the game to the game caller. If a turkey is not responding to the caller when the striker has a hickory peg, the peg can be changed to a peg made from a different material and the length of the peg extending from the body portion can be adjusted to change the sound frequency until a desired response is obtained from the game.

In accordance with one example embodiment, pegs 48, 50, 52 are made from different density materials. Although wood has been mentioned, the pegs can be made from other materials such as carbon fiber, composite materials, etc. Length markings 60 are marked on each of the pegs to aid in selecting the extension length of the peg from the end of the body portion, and, in turn, aid in selecting a desired game call frequency.

The releasable locking device 44, in accordance with one example embodiment shown in FIG. 4, has a through opening 70. The releasable locking device further includes a retaining collar 74 that is received between a threaded locking nut 76 and a threaded portion 78 on the body portion 42. The retaining collar 74 has tapered surfaces that are acted upon by the locking nut 72 and body portion 42 so that when the locking nut 76 is screwed and tightened onto the body portion 42, the retaining collar 74 compresses down onto the peg 48 holding the peg to the body portion 42. The retaining collar 74 may also be referred to as a compression collar. As will be appreciated, the peg length extending from the body portion can be selected and the releasable locking device 44 tightened to hold the peg 48 at the selected length. This adjustment affects the overall length of the striker. The body portion 42 has a hollow opening 80 to receive the second end of the peg.

Figure 6:
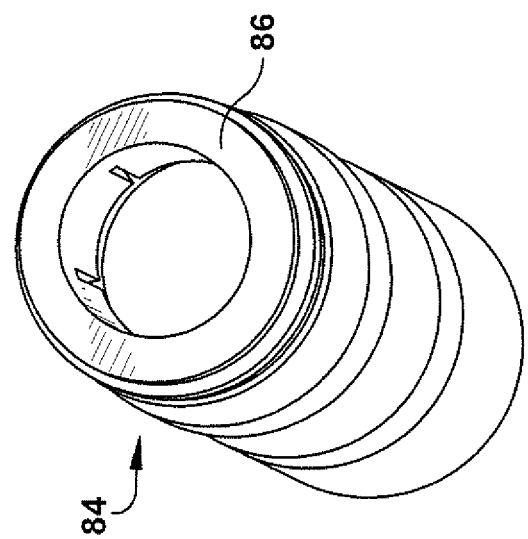
FIGS. 5 and 6 show an alternative releasable locking device for use with the present invention.
Figure 5:
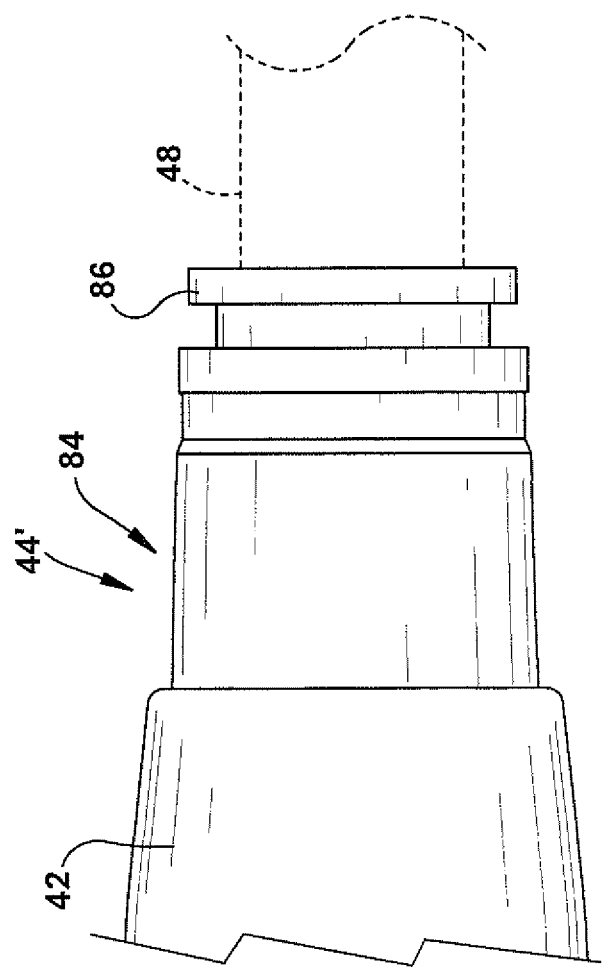

Referring to FIGS. 5 and 6, an alternative releasable locking device 44' shown using a push/pull ferrule 84 secured to the end of the body portion 42 for releasably locking the peg 48 to the body portion 42. The push/pull ferrule includes a push/pull locking member 86 that, when the member 86 is pushed in, allows the peg 48 to slide relative to the body portion 42. When the member 86 is pulled outward away from the body portion 42, it locks the peg 48 to the body portion 42 at the selectable length of the peg extending from the body portion.

Figure 7:
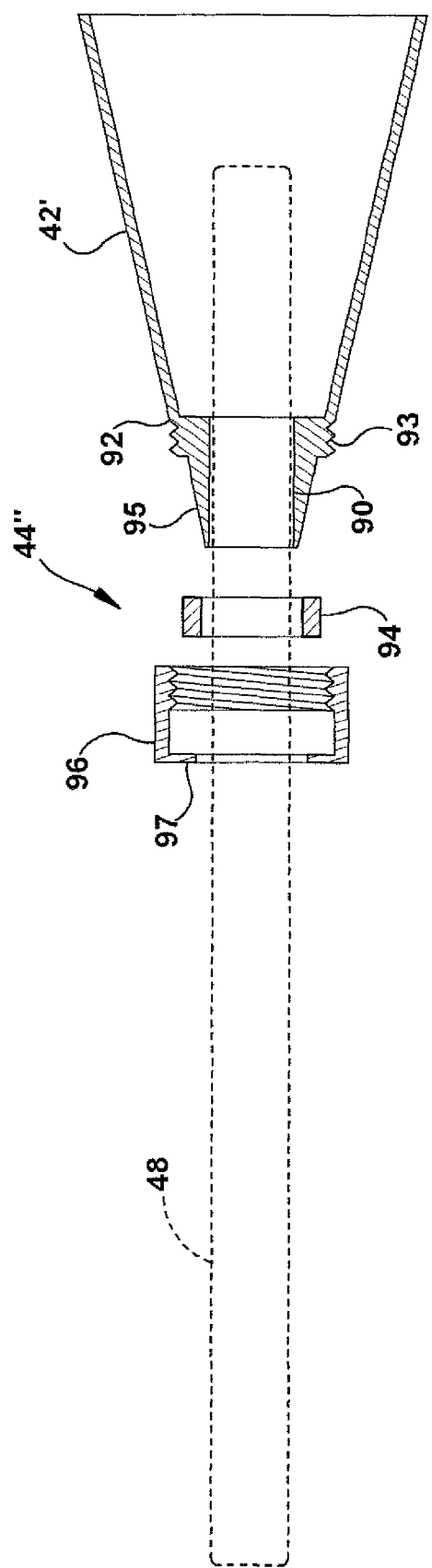
FIG. 7 shows another alternative releasable locking device for use with the present invention.

Referring to FIG. 7, another releasable locking device 44" is shown. The body portion 42' includes flexible fork extensions 90 extending from the end 92 of the body portion 42'. A threaded receiving portion 93 is located also at the end of the body portion and spaced away from the ends of the fork extensions 90. A locking collar 94 fits over the forks and dimensioned to contact the outer surface 95 of the forks 90. A locking nut 96 is dimensioned to fit over the locking collar 94 and has a surface 97 having a diameter less than that of the locking collar 94. When the locking nut 96 is threaded onto the threaded receiving portion 93 of the body portion 42', the diameter of the forks decreases (the forks are forced radially inward) so as to engage and hold the peg 48 to the body portion 42'. It will be appreciated that an appropriate shaped locking nut could eliminate the need for the locking collar.

From the above description of the invention, those skilled in the art will perceive improvements, changes and modifications. Such improvements, changes and modifications within the skill of the art are intended to be covered by the appended claims.

Having described the invention, the following is claimed:

1. A striker for game calling comprising:
    a hollow body portion;
    a releasable locking device located at one end of the hollow body portion; and
    a peg having a substantially circular cross section along the entire length of the peg, the peg surrounded by said releasable locking device and received in and extending from the hollow body portion at any of a plurality of selectable lengths and securely held to the hollow body portion at a selected length by the releasable locking device,
    wherein the releasable locking device includes a threaded receiving portion at the end of the body portion, a compression collar, and a threaded locking nut, said compression collar placed over said peg and located between said threaded receiving portion and said threaded locking nut, the tightening of said threaded locking nut onto said threaded receiving portion compressing said compression collar into contact with said peg so as to releasably lock said peg to said body portion, and wherein said compression collar has tapered surfaces upon which the threaded receiving portion and the threaded locking nut apply force against said compression collar when the threaded locking nut is tightened onto the threaded receiving portion.

2. A striker for game calling comprising:
    a hollow body portion;
    a releasable locking device located at one end of the hollow body portion; and
    a peg having a substantially circular cross section along the entire length of the peg, the peg surrounded by said releasable locking device and received in and extending from the hollow body portion at any of a plurality of selectable lengths and securely held to the hollow body portion at a selected length by the releasable locking device, wherein the releasable locking device includes a threaded receiving portion and tapered flex forks at the end of the body portion, and a locking nut adapted to be threaded onto said threaded receiving portion, the locking nut, when threaded onto said threaded receiving portion applying compression force against said tapered flex forks so that said tapered flex forks releasably lock said peg to said body portion.

3. The striker of claim 2 wherein the releasable locking device further includes a locking collar located between said locking nut and said threaded receiving portion to aid in the application of compression force against said tapered flex forks upon tightening of said locking nut onto said threaded receiving portion.

4. A striker for game calling comprising:
    a body portion;
    a releasable locking device located at one end of the body portion; and
    a peg extending from the body portion and held to the body portion by the releasable locking device,
    wherein the releasable locking device includes a threaded receiving portion at the end of the body portion, a compression collar, and a threaded locking nut, said compression collar placed over said peg and located between said threaded receiving portion and said threaded locking nut, the tightening of said threaded locking nut onto said threaded receiving portion compressing said compression collar into contact with said peg so as to releasably lock said peg to said body portion, and wherein said compression collar has tapered surfaces upon which the threaded receiving portion and the threaded locking nut apply force against said compression collar when the threaded locking nut is tightened onto the threaded receiving portion.

5. A striker for game calling comprising:
a body portion;
a releasable locking device located at one end of the body portion; and
a peg extending from the body portion and held to the body portion by the releasable locking device,
wherein the releasable locking device includes a threaded receiving portion and tapered flex forks at the end of the body portion, and a locking nut adapted to be threaded onto said threaded receiving portion, the locking nut, when threaded onto said threaded receiving portion applying compression force against said tapered flex forks so that said tapered flex forks releasably lock said peg to said body portion.

6. The striker of claim 5 wherein the releasable locking device further includes a locking collar located between said locking nut and said threaded receiving portion to aid in the application of compression force against said tapered flex forks upon tightening of said locking nut onto said threaded receiving portion.

* * * * *